(12) United States Patent
Albright et al.

(10) Patent No.: US 6,694,571 B2
(45) Date of Patent: Feb. 24, 2004

(54) LOADER ATTACHMENT PIVOT PIN ASSEMBLY

(75) Inventors: Larry E. Albright, Gwinner, ND (US); Mark F. Bares, Oakes, ND (US)

(73) Assignee: Clark Equipment Company, Woodcliff Lake, NJ (US)

( * ) Notice: Subject to any disclaimer, the term of this patent is extended or adjusted under 35 U.S.C. 154(b) by 0 days.

(21) Appl. No.: 10/186,523

(22) Filed: Jul. 1, 2002

(65) Prior Publication Data

US 2004/0000032 A1 Jan. 1, 2004

(51) Int. Cl.[7] .................................................. E05D 5/10
(52) U.S. Cl. ............................ 16/386; 16/380; 403/154
(58) Field of Search .................... 16/386, 380; 403/158, 403/154, 71, 14, 162, 149

(56) References Cited

U.S. PATENT DOCUMENTS

| 2,967,726 | A |   | 1/1961  | Weston ........................ 287/100 |
| 3,554,588 | A |   | 1/1971  | Reinsma et al. ............ 287/100 |
| 3,890,672 | A | * | 6/1975  | Berthagen .................... 16/340 |
| 3,936,203 | A |   | 2/1976  | Lowder et al. ............. 403/154 |
| 3,964,799 | A | * | 6/1976  | Knapp ......................... 384/129 |
| 4,096,957 | A |   | 6/1978  | Iverson et al. .......... 214/145 R |
| T985,006  | I4 | * | 8/1979  | Drochner .................... 403/163 |
| 4,251,182 | A |   | 2/1981  | Schroeder ................... 414/723 |
| 4,400,898 | A |   | 8/1983  | Christensen et al. ...... 37/118 A |
| 4,528,718 | A | * | 7/1985  | Brockhaus ................... 16/266 |
| 4,607,977 | A |   | 8/1986  | Varnelis et al. ............. 403/154 |
| 4,609,322 | A | * | 9/1986  | Quant ......................... 414/685 |
| 5,242,238 | A |   | 9/1993  | Warner et al. .............. 403/154 |
| 5,630,673 | A |   | 5/1997  | Krzywanos et al. ........ 403/158 |
| 5,836,209 | A | * | 11/1998 | Ebenstein ................ 74/473.21 |
| 5,960,937 | A | * | 10/1999 | Stebnicki et al. ........... 198/851 |
| 6,158,917 | A |   | 12/2000 | Wolin et al. ................ 403/319 |
| 6,273,632 | B1 |  | 8/2001  | Takahashi et al. .......... 403/154 |

* cited by examiner

Primary Examiner—Chuck Y. Mah
(74) Attorney, Agent, or Firm—Westman, Champlin & Kelly

(57) ABSTRACT

A pivot pin assembly is formed by providing a cylindrical pin portion with a boss at one end. The boss has a flat shoulder surface, so that its periphery is non-circular. A lever arm is provided with a bore that fits over and is complimentary to the boss, and the lever arm is held in place on the boss with a removable threaded fastener that secures the lever arm and the cylindrical pin portion together.

10 Claims, 2 Drawing Sheets

LOADER ATTACHMENT PIVOT PIN ASSEMBLY

BACKGROUND OF THE INVENTION

The present invention relates to a pivot pin assembly for pivotally mounting two highly loaded parts together, and which has an arm or lever that can be secured to one of the parts carrying the pin to prevent rotation of the pin as a second part, also mounted on the pin, rotates relative to the first part. In particular, the pivot pin assembly has a shoulder, forming a non-circular boss on one end and a retainer lever is provided with a bore fitting over the boss. A cap screw is screwed into the end of the pin and used to retain the lever on the boss.

In the prior art, pivot pins used in high load pivots, such as the pivot pin securing an accessory attachment plate to the front end of loader arms, are secured to prevent pin rotation when the two parts pivot. One form of pin retainer is to provide a cross bore through a support hub and the pin at one end, and inserting spring pin or a cotter pin to secure the pivot pin to the hub that surrounds the pivot pin.

In another type of pivot pin, a lever or plate is welded to the pin end and the lever is secured to a surface of one of the pivoting parts. This type of pin is widely used, but requires purchasing a heat treated pin, welding the lever or retainer plate on the pin, and then sending the weldment out for plating and/or further heat treatment after welding.

Other types of securable pivot pins also are available, such as pins that have irregular shaped pin heads that will fit into a receptacle.

SUMMARY OF THE INVENTION

The present invention relates to a pivot pin used to pivotally mount two parts together, such as a bucket or accessory mounting plate at the ends of loader arms. The pivot pin has a radially extending lever or retainer plate at one end of the pin that is secured to one of the parts to prevent the pin from rotating. The accessory mounting plate on a loader is tiltable on the pivot pins when underload, using a hydraulic cylinder. The pivot pins may tend to rotate unless restrained.

The pins of the present invention are circular cross section cylinders having a central axis, which forms a pivot axis of the two parts that are held by the pin. An end of the pin has a surface that is at least partially at right angles to the central axis. A shoulder is formed at the one end so that the end surface is stepped or has a "boss". The shoulder has a surface portion that is non-circular, to form a stop surface. A lever or plate has a bore or receptacle that receives the boss, and the lever bore has an inner edge surface that mates with the shoulder so the lever will not rotate about the pin axis. When the outer end of the lever is restrained by fixing it to one of the parts that is pivoted together, the lever will resist the torque that tends to rotate the pin.

The pin assembly of the present invention provides a great advantage in manufacturing. A hardened pin can have an end machined easily to the desired boss shape, and a lever opening can be punched to receive the boss at the end of the pin. The lever is held onto the pin end with a bolt and washer, or a flanged head bolt, that has a surface of size to bear on the lever to hold the lever onto the boss. The lever or arm is rigidly clamped to the pin when the bolt is tightened.

One form of the invention has a single flat surface so that the boss forms a "D" shape, and a second form has two machined, parallel flat surfaces forming the boss that extends diametrically across the end of the pin. The non-circular surfaces can be planar, serrated, undulating or other suitable configurations. The mating opening in the retainer lever or arm is formed to fit over the boss.

DETAILED DESCRIPTION OF THE ILLUSTRATIVE EMBODIMENTS

Figure 1:
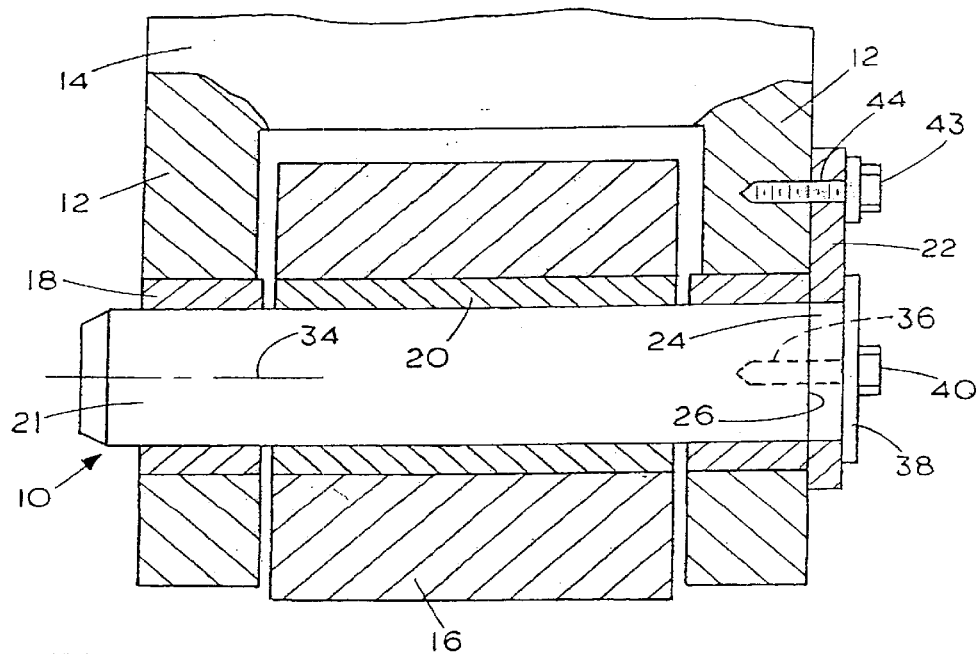
FIG. 1 is a schematic sectional view of two parts that are pivoted together, such as an end portion of a loader arm, and a pivot pin made according to the present invention for securing a bucket or a bucket attachment plate to the loader arm.
Figure 2:
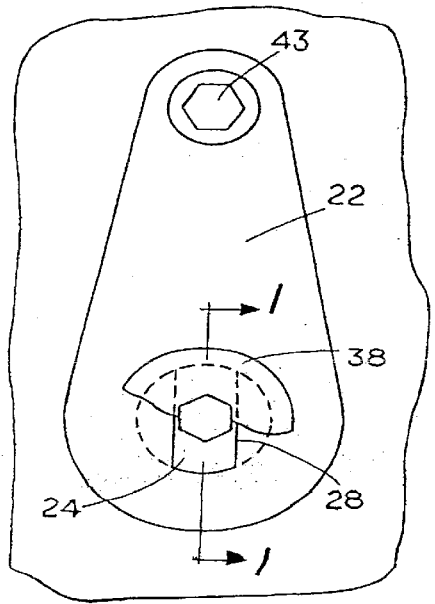
FIG. 2 is an end elevational view of the pin of FIG. 1.

Referring to FIG. 1, a pin assembly of the present invention is illustrated generally at 10, and is shown in place as a pivot pin joining a first part, which may be the end portion of a loader arm 14, to a second part 16 that can be a hub from a bucket, or a quick attachment plate for a bucket or other loader attachment tool. The second part 16 will pivot relative to the first part loader arm 14, usually using a hydraulic actuator. Suitable bushings 18 can be provided in the spaced apart end flanges or portions 12 of the loader arm 14, and also a bushing 20 can be provided around on the interior of the bore in the second part or hub 16.

The pin assembly 10 is restrained from rotation relative to one part, and in the illustrated embodiment the pin is held by attaching a lever arm 22 to one of the end flanges 12 on the loader arm 14. The plate or lever arm 22 is attached to one end of the cylindrical pin portion 21. This end of the pin portion 21, as shown, has a boss 24 formed thereon, with planar surfaces 26 along side the boss (see FIG. 3). The lever arm 22, as shown, has an opening 28 that has a complimentary configuration to the periphery of the boss 24, and fits over the boss. The lever arm 22 rests against the surfaces 26, which are perpendicular to the central axis 34 of the pin 10. This central axis 34 is the pivot axis between the first and second parts.

Figure 3:
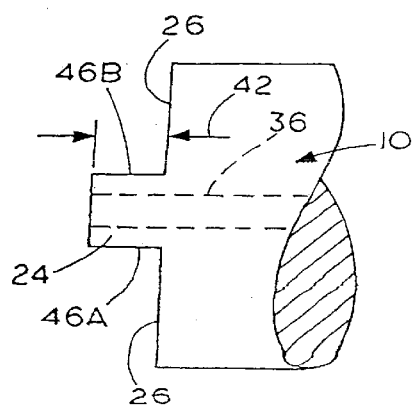
FIG. 3 is a fragmentary side view of a pin illustrating a boss at the end of the pin that is used for mounting a lever or arm that resists rotation.

In order to retain the lever arm 22 in position on the end of cylindrical portion 21 of the pin assembly 10, the pin is provided with a threaded internal axial bore shown in dotted lines at 36, and this bore 36 extends through the boss 24 into the interior of the cylindrical pin portion 21. A flanged retainer, such as a washer shown in 38, is positioned on the outer surface of the lever arm 22, and a cap screw 40 is threaded into the interior bore 36 to clamp the flange or washer 38 against the outer surface of the lever arm 22 and hold the pin portion 21 and the lever arm 22 in a rigid assembly. The axial direction height of the boss 24 from the surface 26, indicated by the arrows 42 in FIG. 3, is less than the thickness of the lever arm 22, so that the flange or washer 38 is clamped tightly with the cap screw 40 to securely hold the lever arm in position.

The lever arm 22 has a hole or bore 44 at an outer end thereof, spaced from the central axis 34, and a second cap screw 46 is threaded into a threaded opening in the flange 12 of the loader arm 14, to secure the pin assembly in position and hold the unit tightly locked. The cylindrical pin portion 21 does not rotate and the pin assembly 10 will resist torque.

It can thus be seen that the pin portion 21 can be pre-hardened, before the boss is machined and before the lever arm is put into place. It can also be seen that the boss 24 has straight, flat surfaces 46A and 46B on opposite sides of the boss in this form of the invention. Surfaces 46A and 46B are parallel to the central axis 34, and are "chordal" surfaces offset from the central axis of the cylindrical pin portion. The surfaces 46A and 46B are perpendicular to the end surfaces 26, and are non-circular surfaces that will provide a resistance to rotation of a lever arm 22 having a complimentary shaped opening or bore in position on the boss and secured in place with a cap screw. The lever arm 22 can be separately made, and the opening for the boss punched out. The pin and lever arm can be individually plated for corrosion protection. The hardened pin portion 21 does not have to be re-heated to restore its hardness after welding.

The final assembly can be made when the pin portion is put into place in the two mating parts, the lever arm can be put into place and the cap screw 40 provided with a flange 38 tightened down to provide a force to clamp the arm or lever 22 against the end surfaces 26 of the pin.

Figure 4:
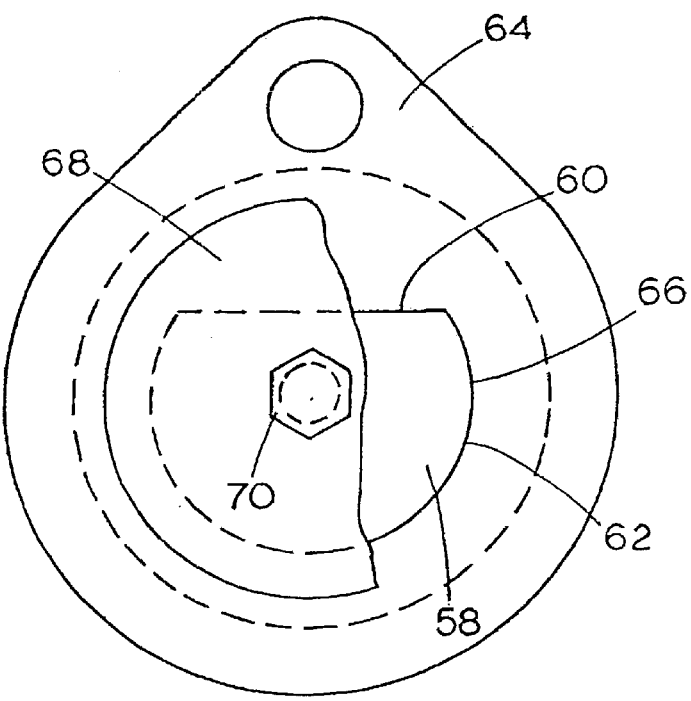
FIG. 4 is an end view of a modified form of the present invention.
Figure 5:
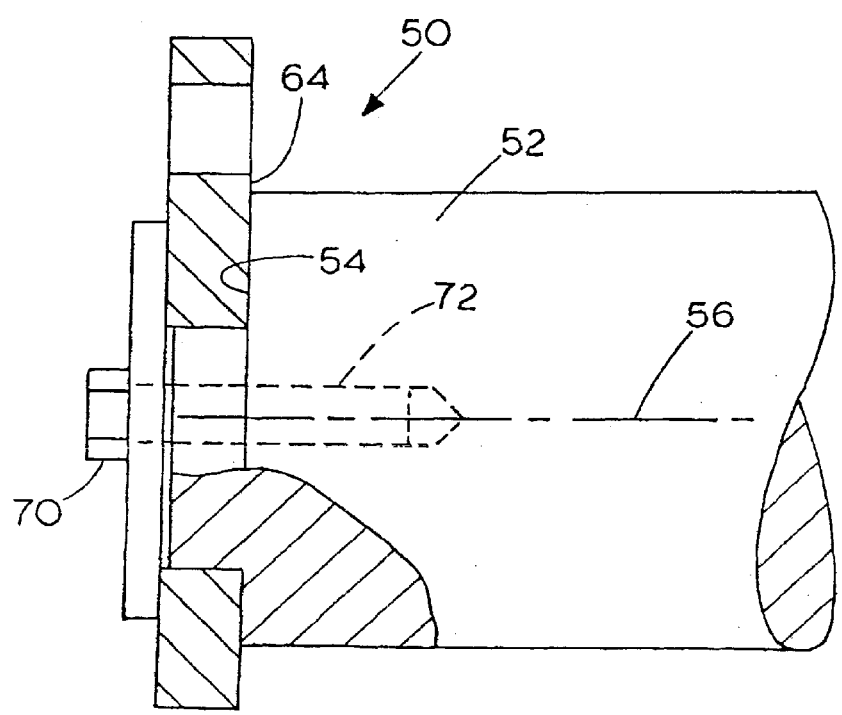
FIG. 5 is a fragmentary side view of the form of pin in FIG. 4 with parts in section and parts broken away.

A second embodiment is shown in FIGS. 4 and 5, with a different configuration for the boss and the lever arm. In this embodiment, a pin assembly 50 has a cylindrical pin portion 52, and one end of the pin portion forms an end surface 54 perpendicular to a central axis 56 of the pin portion 52. A "D" shaped boss 58 is formed, with one chordal flat surface 60, and a rounded periphery 62 which is smaller diameter than the pin portion 52. The surface 54 surrounds the boss 58 and provides a resting surface for the lever arm or disc 64. The arm or disc 64 has a complimentary opening 66 to receive the boss 58. A loading flange or washer 68 is placed over the outer surface of the arm or disc 64 and then a cap screw 70 is threaded into place in an interior bore 72 in the pin portion to clamp the arm tightly against the surface 54. The thickness or axial length of the "D" shaped boss 58 again is less than the thickness of the arm or disc 64, so that the cap screw 70 tightly clamps the arm or disc 64 in place.

The pin portion 52 can hardened, and then machined to form a boss having at least one non-circular shoulder surface 60. The surface 60, as shown, is parallel to the axis 56, and forms a chordal surface that is non-circular, so when the complimentary shaped opening or bore in the lever arm or disc is placed over the boss, the lever arm will not rotate relative to the pin portion 52.

The shoulder surface 60 does not have to be planar or flat along its entire length. It is non-circular, however, to ensure that the arm does not rotate relative to the pin portion.

The lever arm or disc 64 again can be separately made, and then clamped in place either before or after mating the two pivoting parts together. The lever arms used can be shaped to accommodate existing structures, and provide adequate clearance for the lever arms. The lever arms can be shaped like discs, plates or other selected outer peripheries.

In this specification, the term lever arm or lever is intended to include discs, plates, straps and the like which are securable to one pivoting part at a position spaced outwardly from the axis of the pin to resist pin rotation.

Although the present invention has been described with reference to preferred embodiments, workers skilled in the art will recognize that changes may be made in form and detail without departing from the spirit and scope of the invention.

What is claimed is:

1. A pivot pin assembly for securing two relatively movable parts together for movement about a pin axis, wherein the pivot pin assembly is to be held from rotating relative to one of the moveable parts, the pivot pin assembly including a pin having a boss at one end, extending from one end surface of the pin, portions of the one end surface extending laterally from the boss, the boss having a non-circular periphery, a lever arm having a bore complimentary to the boss periphery, the lever arm having a thickness dimension, the bore extending across the thickness dimension, the boss extending from the one surface a distance less than the thickness dimension, and a securing member for holding the lever arm onto the boss with the boss in the bore, and for forcing the lever against the portions of the one end surface.

2. The pivot pin assembly of claim 1 wherein the pin is a right circular cylinder and the portions of the one end surface are substantially perpendicular to a central axis of the pin.

3. The pivot pin assembly of claim 2 wherein the boss has at least one planar edge surface forming a shoulder.

4. The pivot pin assembly of claim 3 wherein the securing member comprises a threaded member threaded into a bore in the one end of the pin, said threaded member having a head exerting a force on a surface of the lever arm urging the lever arm onto the boss and against the portions of the one end surface.

5. The pivot pin assembly of claim 1 wherein the boss has two edge surfaces that are parallel to a central longitudinal plane of the pin and perpendicular to the portions of the one end surface.

6. A pivot pin having a pin portion with an end surface substantially perpendicular to a central longitudinal axis of the pin portion, a boss raised from the end surface and having a non-circular periphery, said boss leaving a portion of the end surface around at least portions of the boss, a lever arm of a length extending laterally beyond a side surface of the pin portion and having a bore across a thickness dimension of the lever arm with surfaces that are complimentary to and that closely fit around the periphery of the boss, the boss having an outer end that extends from the portion of the end surface less than the thickness dimension of the lever and a removable securement device having a portion that bears against an outer surface of the lever arm and forces the lever arm against the portion of the end surface to hold the lever arm in position on the boss.

7. The pivot pin of claim 6 wherein the boss periphery includes a pair of flat edge surfaces mating with surfaces defining the bore of the lever arm.

8. The pivot pin of claim 7 wherein the pair of flat edge surfaces are parallel to each other, and are parallel to the central longitudinal axis of the pin portion, said edge surfaces being offset from the central longitudinal axis of the pin portion and spaced apart a desired amount.

9. The pivot pin of claim 6 wherein the bore in the lever arm is adjacent a first end of the lever arm, and the securement device is a headed threaded fastener that threads into a bore in the pin portion at the one end, and the threaded fastener being adapted to exert a force holding the lever arm onto the boss.

10. A method of making a pivot pin assembly including a hardened pin portion having a longitudinal axis and a lever arm, comprising separately forming a non-circular shouldered boss at one end on the hardened pin portions having a height measured along the longitudinal axis from adjacent surface portions of the one end of the hardened pin, separately forming a lever arm having a receptacle that receives the shouldered boss, the receptacle having a length greater than the height of the shouldered boss such that the shouldered boss is entirely within the receptacle, and providing a securing aperture in the lever arm spaced outwardly from the receptacle, placing the receptacle onto the shouldered boss, with the lever arm extending laterally from the hardened pin portion, and securing the lever arm to the end of the pin portion by threading a fastener axially into the pin portion to first exert a longitudinal axial force bringing the lever arm against the adjacent surface portions without exerting longitudinal axial force on an end of the boss.

* * * * *